ROOT & HOLYOKE.
Car-Track Clearer.
No. 14,169.
Patented Jan. 29, 1856.
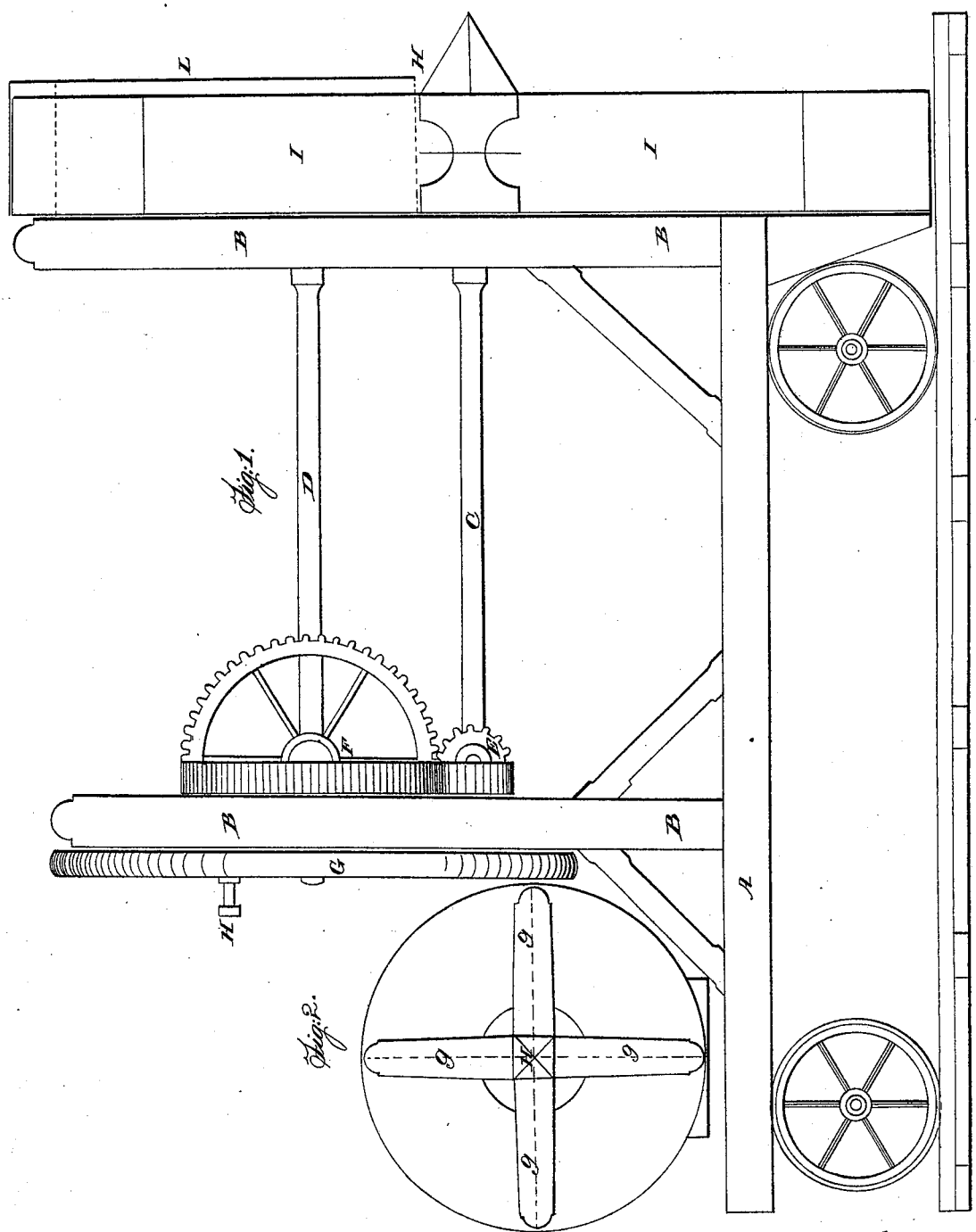

UNITED STATES PATENT OFFICE.

RILEY ROOT AND SAML. G. HOLYOKE, OF GALESBURG, ILLINOIS.

MACHINE FOR CLEARING SNOW FROM RAILROAD-TRACKS.

Specification of Letters Patent No. 14,169, dated January 29, 1856.

*To all whom it may concern:*

Be it known that we, RILEY ROOT and SAMUEL G. HOLYOKE, of the town of Galesburg, county of Knox, and State of Illinois, have invented a Machine for Cleaning Railroads of Snow, called a "Rotary Blower"; and we do hereby declare that the following is a full and exact description thereof, reference being had to the accompanying drawings and to the letters of reference marked thereon.

The machine is to be placed on an open freight car, the blower projecting over the front end of the car, and rotating at right angles with the track, and either way to take advantage of the wind, throwing the snow with the wind so that it shall not be blown back into the track. The front end of the car is boarded up, at right angles to the track, three inches above the orbit of rotation of the blower, and downward to within one inch of the track, projecting three inches outside of the track, and then up to the orbit, and thence in the line of the circumference to even with center of motion. This boarding forms a guard, and is fastened on the frame in which the machinery runs, between the frame and the blower. The blower consists of wings and knives. Four wings, from 20 to 24 inches wide, project from the pinion shaft, at right angles to said shaft, each pair of wings forming a straight line, one wing with the other, and to be made of boiler iron, or any other material sufficiently strong. On the outer edge of the wings are knives, made sharp at each edge, made of steel, one foot wide at the shaft, and nine inches wide at the outer end of the wing, and fastened onto the wing at right angles, so as to form an equal flange on each side of the wing. On the inside of the wing, or the edge of the same next to the guard, are flanges of equal width with the knives, but not sharpened. The knives are to be slightly concave on the face or cut of the blower. The knife on the one edge of the wing, and the flange on the other edge form, with the wing, a large groove, which directs the snow as it is thrown off in right angles with the track. At the end of the pinion shaft, or center of the face of the blower, is a point or angular spur to cut out the center of one foot, where the knives cross each other, these knives, flanges and wings to be fastened to strong iron arms projecting from an iron hub, one foot in diameter, through the center of which the blower shaft passes.

The machine consists of two shafts with a cogwheel on each. The blower or pinion shaft, and pinion wheel should be large enough to be sufficiently strong. The machinery should gear about three to one. There should be a balance wheel which may be on either shaft. If driven by the pinion shaft it should be on the blower itself, and next the guard. The machine must be driven by an engine placed on the car, and the car impelled forward by a locomotive. At the outside of the orbit knives may be perpendicularly as high as necessary to cut the snow above the center of motion. The knives are placed just forward of the front cut of the blower, and are supported by bars projecting at right angles to the guard, the bars to be far enough apart to have an open space as large as convenient for the snow to blow through.

The following is an explanation of the parts: As lettered on the drawings, A represents the floor of the car; B, the timbers or wooden frame in which the machine runs; C, the blower shaft; D, the driving shaft; E, the pinion wheel; F, the driving wheel; G, the balance wheel; H, the stem or wrist to which the driving power attaches; I, the blower; K, a spur placed on the front of the blower, at the center. The dotted lines are bars to support perpendicular knives; L, perpendicular knives.

We do not claim a revolving track cleaner driven by the running gear of the locomotive, as we are aware that various forms of such have been proposed, but What we do claim as our invention, and desire to secure by Letters Patent, is—

The arrangement of a rotary fan blower, provided with knives, and made sufficiently large to sweep the entire width of the track. The said rotary blower is to be driven by a power independent of the locomotive wheels, and is capable of being revolved in either direction, at right angles to the direction of the track.

RILEY ROOT.
SAMUEL G. HOLYOKE.

Witnesses:
LUCIAN MILLS,
LOYAL C. FIELD.